(12) United States Patent
Oosawa et al.

(10) Patent No.: US 7,462,420 B2
(45) Date of Patent: Dec. 9, 2008

(54) ELECTRODE WITH A PHASE-SEPARATED BINDER THAT INCLUDES A VINYLIDENE FLUORIDE BINDER POLYMER AND A POLYETHER POLAR POLYMER WITH A LITHIUM SALT

(75) Inventors: Yasuhiko Oosawa, Yokosuka (JP);
Yasunari Hisamitsu, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 638 days.

(21) Appl. No.: 10/700,646

(22) Filed: Nov. 5, 2003

(65) Prior Publication Data

US 2004/0101752 A1    May 27, 2004

(30) Foreign Application Priority Data

Nov. 11, 2002   (JP)   ............ P2002-326700

(51) Int. Cl.
*H01M 4/62* (2006.01)
(52) U.S. Cl. .................. 429/217; 429/231.95
(58) Field of Classification Search ............ 429/231.95, 429/217
See application file for complete search history.

(56) References Cited

U.S. PATENT DOCUMENTS 6,291,102 B1 *  9/2001  Yoshida et al. ......... 429/231.95
6,547,838 B1 *  4/2003  Lee et al. ................... 29/623.1
6,815,121 B2 * 11/2004  Dasgupta et al. ............ 429/212
6,869,730 B2 *  3/2005  Matsubara et al. .......... 429/217

FOREIGN PATENT DOCUMENTS

| EP | 0 849 225 | 6/1998 |
| EP | 1 198 022 | 4/2002 |
| JP | 5-314965 | 11/1993 |
| JP | 10172573 A * | 6/1998 |
| JP | 11-204136 | 7/1999 |
| JP | 2000-090728 | 3/2000 |
| JP | 2000-100471 A | 4/2000 |
| JP | 2002-75455 A | 3/2002 |
| JP | 2003-217594 | 7/2003 |
| WO | WO 02/073720 | 9/2002 |
| WO | WO 02/078114 A1 | 10/2002 |

OTHER PUBLICATIONS

NIST Printout for 2-Propenoic acid, 2-methyl-, methyl ester (methyl methacrylate).*
Search Report, May 31, 2006.
Michiyuki Kono, et al. "Network Polymer Electrolytes with Free Chain Ends as Internal Plasticizer." J. Electrochem. Soc., vol. 145, No. 5 May 1998. The Electrochemical Society Inc. pp. 1521-1527.

* cited by examiner

*Primary Examiner*—Mark Ruthkosky
(74) *Attorney, Agent, or Firm*—McDermott Will & Emery LLP

(57) ABSTRACT

An electrode for an all solid polymer battery comprises electrode active material particles which can absorb and release lithium ion through oxidation-reduction, a binder polymer, a polar polymer, and lithium salt. Herewith, the electrode for the all solid polymer battery, in which the cycle durability of the electrode is greatly improved, is provided.

8 Claims, 3 Drawing Sheets

ELECTRODE WITH A PHASE-SEPARATED BINDER THAT INCLUDES A VINYLIDENE FLUORIDE BINDER POLYMER AND A POLYETHER POLAR POLYMER WITH A LITHIUM SALT

BACKGROUND OF THE INVENTION

1. Field of the Invention

The present invention relates to an electrode for an all solid polymer battery mainly containing a polymer and a lithium salt as an electrolyte phase, and relates to a method for manufacturing the electrode and to a battery using the same.

2. Description of the Related Art

In recent years, as large capacity power sources of electric vehicles, hybrid electric vehicles, and the like, lithium ion secondary batteries which can attain high energy and power densities have been developed. The lithium ion secondary batteries have a basic construction as follows. A positive electrode layer includes an aluminum collector to which a positive electrode active material such as lithium cobaltate ($LiCoO_2$) and a conductive material such as acetylene black are applied using a binder. A negative electrode layer includes a copper collector to which a negative electrode active material such as carbon particles is applied using a binder. The positive and negative electrode layers are arranged with a porous polyolefin film separator interposed therebetween and are filled with a non-aqueous electrolytic solution containing $LiPF_6$ and the like.

When applying the lithium ion secondary batteries to the electric vehicles and the like, single cells having this construction are connected in series to construct a battery module unit. Further, an assembled battery is constructed by connecting these battery module units in series.

In view of the energy density and the power density of batteries, there have been demands for improvement in connection resistances between cells and between modules, in space and in weight. Recently, a battery employing a bipolar electrode unit has been proposed. In this bipolar electrode unit, the connection resistance between cells can be reduced and downsizing thereof can be expected (see Japanese Patent Application Laid-Open No. H 11-204136). In this proposal, a so-called clad material made by rolling two types of metal foils is used for the collector, and a gel electrolyte is used for the electrolyte. Therefore, a liquid junction could occur between cells, so it is essential to hermetically seal each cell. If a solid polymer electrolyte is used instead of this gel electrolyte, the hermetic seal is not required, and thus a practical bipolar battery can be constructed (see Japanese Patent Application Laid-Open Nos. 2000-100471 and 2002-75455). In the bipolar battery, which is an all solid polymer battery including the solid polymer electrolyte as the electrolyte, there is an advantage of having extremely high reliability without liquid leakage, gas generation, and the like since a liquid electrolyte is not contained. In the negative electrode layer of such an all solid polymer battery, carbon particles are usually employed as the negative electrode active material due to being excellent in terms of battery characteristics and cost efficiency.

SUMMARY OF THE INVENTION

However, in the conventional all solid polymer battery using carbon particles as the negative electrode active material, the negative electrode layer has low reactivity, therefore graphite with a small particle diameter has been used. Accordingly, the reactivity of the negative electrode layer can be improved, and the charge/discharge characteristic is improved in the initial several cycles. However, the charge/discharge cycle durability of the negative electrode layer has remained low. Accordingly, it has been difficult to apply the conventional all solid polymer battery to the large capacity power sources of the electric vehicles and the like which are developed for long-term use.

The present invention was made in consideration of the above-described problems. It is an object of the present invention to provide an electrode for an all solid polymer battery, in which the cycle durability of the electrode is greatly improved, a method for manufacturing the same, and an all solid polymer battery using the electrode for an all solid polymer battery.

The first aspect of the present invention provides an electrode for an all solid polymer battery, comprising: electrode active material particles which can absorb and release lithium ion through oxidation-reduction; a binder polymer; a polar polymer; and lithium salt.

The second aspect of the present invention provides a method for manufacturing an electrode for an all solid polymer battery, comprising: manufacturing slurry by dispersing electrode active material particles, which can absorb and release lithium ion through oxidation-reduction, in a solution containing a binder polymer, a polar polymer, a lithium salt, and a thermal polmerization initiator as needed; applying the slurry to a support member; and heating and drying the support member to which the slurry is applied.

The third aspect of the present invention provides an all solid polymer battery, comprising: an electrode for an all solid polymer battery including electrode active material particles which can absorb and release lithium ion through oxidation-reduction, a binder polymer, a polar polymer, and lithium salt.

The fourth aspect of the present invention provides a bipolar battery, comprising: an electrode for an all solid polymer battery including electrode active material particles which can absorb and release lithium ion through oxidation-reduction, a binder polymer, a polar polymer, and lithium salt.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
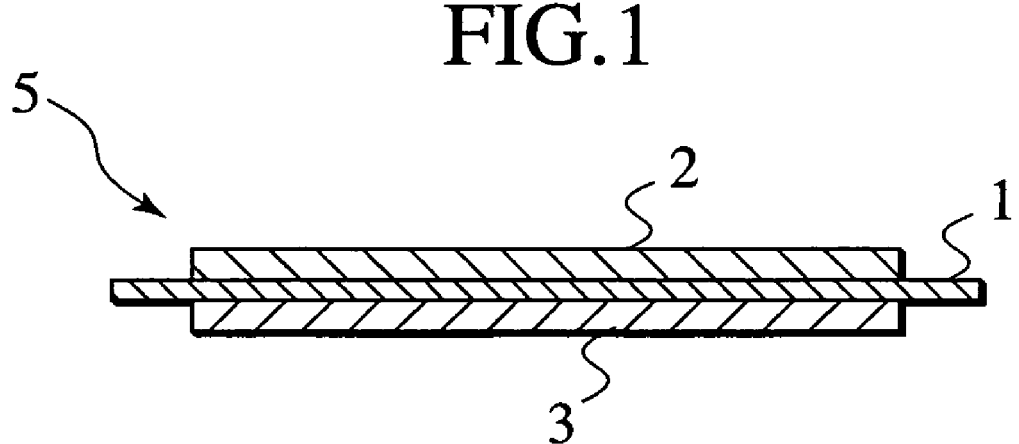
FIG. 1 is a schematic cross-sectional view showing a basic structure of a bipolar electrode of a bipolar battery according to the present invention.
Figure 2:
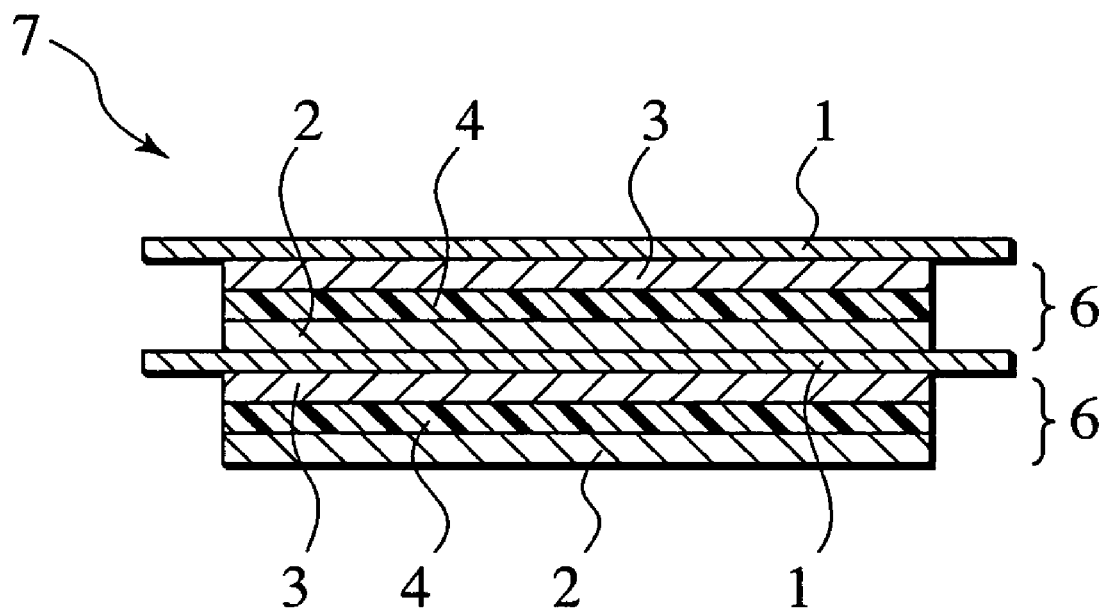
FIG. 2 is a schematic cross-sectional view showing a basic structure of a single cell layer of the bipolar battery according to the present invention.

Hereinafter, description will be made of embodiments of the present invention with reference to the drawings.

An electrode for an all solid polymer battery according to the present invention is characterized by including electrode active material particles which can absorb and release lithium ions by oxidation-reduction, a binder polymer, a polar polymer, and a lithium salt. From the viewpoint of microstructure, the electrode for the all solid polymer battery of the present invention has a structure in which the binder polymer and the polar polymer are phase-separated (microphase separation). From the viewpoint of product-by-process, the electrode for the all solid polymer battery is one obtained in the following manner. Slurry with the electrode active material particles dispersed in a solution containing the binder polymer, the polar polymer, the lithium salt, and a thermal polymerization initiator as needed is applied to a support member, and then heated and dried. In other words, the binder polymer and the polar polymer are first made into a solution and uniformly mixed, and then the slurry using this is then prepared. After the slurry is applied, the solvent is removed by heating and drying and the electrode for the all solid polymer battery is thus obtained.

In the present invention, in order to improve the cycle durability of the electrode for the all solid polymer battery using the solid polymer electrolyte, it is considered important to maintain good adhesion between the electrode active material particles and the solid polymer electrolyte because the electrode active material expands and contracts with charge and discharge. Therefore, in the present invention, a microphase separation concept is applied, in which it is considered that a binder binds the electrode active material particles to maintain an electrode structure and the solid polymer electrolyte filling between the electrode active material particles functions as an ionic conductor. This actually causes phase separation in the electrode for the all solid polymer battery, and as a result, the cycle durability of the electrode is significantly improved.

For the binder polymer used in the present invention, a polymer having a solvent solubility so as to be slurried in a raw material stage is suitable. In addition, the binder polymer does not require lithium ion conductivity. A polymer material which can maintain good adhesion between the active material particles and the solid polymer electrolyte is suitable for the binder polymer. A detailed mechanism of the action has not been sufficiently revealed, but probably, since interfaces between the binder polymer and the electrode active material particles or the solid polymer electrolyte (polar polymer) can be firmly formed by the binder polymer with the above mentioned characteristics, these interfaces can maintain good adhesion and stability, as a result, this electrode is excellent in reactivity to expansion and contraction.

The binder polymer which can be used in the present invention should not be particularly limited as long as the polymer has the abovementioned characteristics. Examples thereof are polymer materials including rubber or an elastomer such as fluoropolymers such as vinylidene fluoride polymer (for example, homopolymer of vinylidene fluoride (PVDF), copolymer of vinylidene fluoride and hexafluoropropylene, copolymer of vinylidene fluoride and pentafluoropropylene, and copolymer of vinylidene fluoride and chlorotrifluoroethylene), fluorosilicone polymer, tetrafluoroethylene-propylene polymer, fluorophosphazene polymer, tetrafluoroetylene-perfluorovinyl ether polymer. Preferably, the binder polymer is a polymer mainly composed of a repeating unit of vinylidene fluoride. This polymer is excellent in characteristics such as heat resistance, durability, and chemical resistance. In addition, with this polymer, more significant effects can be obtained regarding improvement in cycle durability and reactivity of the electrode for the battery.

The polymer mainly composed of a repeating unit of vinylidene fluoride may be a homopolymer, or for example, a vinylidene fluoride based copolymer as described above. By using such a copolymer, solvent solubility can be increased, and the melting point can be lowered, therefore the temperature can be set lower in heating and drying the raw slurry for the electrode. Thus, even when the raw slurry for the electrode is not heated and dried at such a high temperature as the electrode active material or the material for the electrolyte could be affected, the raw slurry can be sufficiently dissolved to develop the binder function efficiently.

For the polar polymer in the solid polymer electrolyte, a polymer having solvent solubility is suitable in order to be slurried in the raw material stage. Furthermore, a polymer material for the solid polymer electrolyte with lithium ion conductivity is suitable.

Accordingly, the polar polymer which can be used in the present invention should not be particularly limited as long as the polymer has the above-mentioned characteristics. Specifically, polymer materials such as polyether based polymer, polyacrylonitrile (PAN) and polymethylmethacrylate (PMMA) can be used. Preferably, it is desirable to use the polyether based polymer excellent in ion conductivity. Examples of the polyether based polymer include polyether based network polymer synthesized in accordance with a manufacturing method of a literature (*J. Electrochem. Soc.*, 145 (1998) 1521), polyethylene oxide (PEO), polypropylene oxide (PPO), and copolymers thereof. By using such a polyether based polymer as the polar polymer and, preferably, using the polymer mainly composed of a repeating unit of vinylidene fluoride together as the binder polymer, more significant effects can be obtained regarding improvement in cycle durability and reactivity of the electrode for the battery. Moreover, when the polar polymer is polyethylene oxide (PEO), polypropylene oxide (PPO), or the copolymer thereof, there is an advantage in that these materials can dissolve the lithium salts such as $LiBF_4$, $LiPF_6$, $LiN(SO_2CF_3)_2$, $LiN(SO_2C_2F_5)_2$. Furthermore, when the polar polymer is a polymer material which includes a cross-linkable group and forms a cross-linking structure by heating and drying in the manufacturing stage, excellent mechanical strength can be developed and mechanical stability at high temperature can be provided for the electrode, thus it is more advantageous. As the polar polymer material including a cross-linkable group, a polymer material including a cross-linkable functional group (carbon-carbon double bond, etc.) in a molecule can be exemplified. For example, polyethylene oxide (PEO), polypropylene oxide (PPO), and a copolymer thereof, which include a cross-linkable carbon-carbon double bond in a molecule, can be enumerated. However, the polar polymer is not necessarily limited to these.

The proportion of the binder polymer to the total amount of the polar polymer and the binder polymer is desirably within a range of 3 to 70 mass %. When the proportion of the binder polymer is less than 3 mass %, the benefits of improving cycle durability and reactivity of the electrode for the battery brought by use of the binder polymer cannot be much obtained. On the contrary, a proportion of binder polymer of more than 70 mass % is not preferable because ion movement within the electrode is inhibited.

For the constituents used in the electrode for the all solid polymer battery of the present invention other than the polar polymer and binder polymer, including the electrode active material particles and the lithium salt, the following materials can be used, but such constituents are not necessarily limited thereto.

The aforementioned electrode active material particles are divided into positive electrode active material particles and negative electrode active material particles.

As the positive electrode active material particles, composite oxide of transition metal and lithium can be used. Specifically, examples thereof include: Li—Co based composite oxide such as $LiCoO_2$; Li—Ni based composite oxide such as $LiNiO_2$; Li—Mn based composite oxide such as spinel $LiMn_2O_4$; and Li—Fe based composite oxide such as $LiFeO_2$. In addition, the examples include: phosphate compounds or sulfate compounds of transition metal and lithium such as $LiFePO_4$; transition metal oxide or sulfide such as $V_2O_5$, $MnO_2$, $TiS_2$, $MOS_2$, and $MoO_3$; $PbO_2$; AgO; and NiOOH.

In terms of the manufacturing method, it is acceptable if the positive electrode active material particles have a diameter such that the positive electrode material can be slurried or impasted and applied by spray coating or the like to form a film. Furthermore, in order to reduce the electrode resistance of the cell, it is preferable to use a material having a smaller diameter than the material generally used in a lithium ion battery with a liquid electrolyte. Specifically, the preferable mean diameter of the positive electrode active material particles is about 0.1 to 10 μm.

As the negative electrode active material particles, taking into consideration the reactivity in the solid polymer electrolyte, carbon particles, metal oxide particles, or lithium-metal composite oxide particles are preferable. Particularly preferable are carbon particles which enable the battery voltage to be raised. With the carbon particles, the function of the binder polymer to fix the carbon particles is considered to act effectively. Therefore, by applying the carbon particles to the negative electrode, the effect of improving the cycle durability of the electrode for the battery can be obtained more significantly, and thus it is advantageous. Note that as the metal oxide particles, transition metal oxide particles, especially, titanium oxide particles are preferred. As the lithium-metal composite oxide particles, lithium-transition metal composite oxide particles, especially, lithium-titanium composite oxide particles are preferred.

The lithium salt is added to increase the ion conductivity. Specifically, examples of the lithium salts which can be used include, but are not necessarily limited to, anion salts of inorganic acid salts such as $LiPF_6$, $LiBF_4$, $LiClO_4$, $LiAsF_6$, $LiTaF_6$, $LiAlCl_4$, and $Li_2B_{10}Cl_{10}$, anion salts of organic acid salts such as $Li(CF_3SO_2)_2N$, and $Li(C_2F_5SO_2)_2N$, and mixtures thereof.

As constituents other than those described above used in the electrode for the all solid polymer battery, for example, a conductive material, which is used for increasing electron conductivity, and the like can be used. The conductive material may be acetylene black, carbon black, graphite, or the like, but is not necessarily limited to these.

Furthermore, desirably, the electrode for an all solid polymer battery of the present invention has a structure in which voids within the electrode layer for the all solid polymer battery are further filled with a polar polymer and a lithium salt. Note that the voids may be further filled with the conductive material or the like. If the aforementioned electrode for the all solid polymer battery is produced in one step, voids are likely to be formed within the electrode. The voids restrict the movement of ions within the electrode. Therefore, the voids are further filled with a polar solid polymer electrolyte, namely, a solid polymer electrolyte of the polar polymer and the lithium salt and the like, to increase the ion conductivity and diffusibility and suppress ion polarization. Accordingly, the ion mobility and the charge/discharge reactivity can be increased, and at the same time the cycle durability can be improved. However, depending on the production conditions, no voids are formed, or few voids are formed by suppressing formation thereof, even if the electrode is formed in one step. Accordingly, the voids are not necessarily filled. Even with the voids formed, the fact remains that extremely excellent cycle durability is provided compared to the conventional electrode for the all solid polymer battery. To produce the electrode for an all solid polymer battery in one step, for example, slurry with the electrode active material particles dispersed in a solution containing the binder polymer, the polar polymer, the lithium salt, and the thermal polymerization initiator as needed is applied to the support member, and then dried, as described later. As the polar polymer and the lithium salt to be filled in the voids, the same materials as the components of the solid polymer electrolyte of the electrode for the all solid polymer battery can be utilized, and the description thereof is omitted here.

In the electrode for the all solid polymer battery, the blending amounts of electrode active material particles (positive or negative active material particles), binder polymer, polar polymer, and lithium salt, and further, the blending amounts of polar polymer and lithium salt used for filling the voids can be determined just taking into consideration the intended use (prioritizing output power, energy, etc.) of the battery and the ion conductivity, and should not be particularly limited. For example, if the blending amount of solid polymer electrolyte (polar polymer and lithium salt) in the electrode for the all solid polymer battery is excessively small, resistances to ion conductions and diffusion increases within the electrode layer so that the battery performance is reduced. On the contrary, if the blending amount of solid polymer electrolyte in the electrode layer is excessively large, the energy density of the battery is reduced. Accordingly, the blending amounts of electrode active material particles, polar polymer, lithium salt, and further conductive material, etc., may be determined taking into consideration these factors so as to fit to the individual intended use. However, the proportion of the binder polymer to the total amount of the polar polymer and the binder polymer is desirably in a range defined as described above.

The thickness of the electrode for the all solid polymer battery of the present invention should not be particularly limited and should be determined taking into consideration the intended use of the battery and the ion conductivity, as described in terms of the blending amount. The thickness of the general electrode for the all solid polymer battery, which is any of the positive and negative electrodes, is adequate if it is about 10 to 500 μm.

The electrode for the all solid polymer battery of the present invention is one obtained by applying to the support member the slurry with the electrode active material particles dispersed in the solution containing the binder polymer, the polar polymer, the lithium salt, the conductive material, and the thermal polymerization initiator as needed, and then heating and drying the slurry. Furthermore, the electrode filled with the polar polymer and the lithium salt can be obtained by applying the solution of the polar polymer and the lithium salt on the surface of the electrode in the voids within the electrode layer for the all solid polymer battery, then causing the solution to permeate, and then heating and drying the electrode. Since these requirements are defined in terms of product-by-process, these requirements are described in the following manufacturing method.

The method for manufacturing the electrode for the all solid polymer battery of the present invention is characterized by the following. The slurry (slurry for electrode), in which the electrode active material particles dispersed in a solution containing the binder polymer, the polar polymer, the lithium salt, and the thermal polymerization initiator as needed, is applied to the support member and then heated and dried. Note that the aforementioned solution or slurry may contain other additives which can be used for the electrode for the all solid polymer battery of the present invention, for example conductive material and the like.

In the manufacturing method of the present invention, the binder polymer and the polar polymer are once made into a solution, and the slurry for electrode using the solution is prepared and applied to the support member, and then heated and dried. Thus, the electrode for the all solid polymer battery according to the present invention which has an electrolyte phase with a structure in which the binder polymer and the polar polymer are phase-separated can be obtained. This method is, in a manner, a method for manufacturing the desired electrode for the all solid polymer battery in one step.

The binder polymer, the polar polymer, the lithium salt, and the conductive material used in the abovementioned manufacturing method are the same as described for the electrode for the all solid polymer battery, and the description thereof is omitted.

The thermal polymerization initiator which can be added as needed is, for example, azobisisobutyronitrile. The amount of the thermal polymerization initiator can be adjusted in accordance with the intended use of the bipolar battery and the like, and the amount normally used can be added.

A solvent to adjust slurry viscosity such as N-methyl-2-pyrrolidone (NMP) can be selected in accordance with a type of the slurry for electrode. The added amount thereof can be adjusted such that the slurry has a viscosity suitable for being applied, and should not be particularly limited.

The support member to which the slurry for electrode can be applied is determined in accordance with a method for manufacturing the battery. In the case where the electrode is formed directly on the collector or the electrolyte layer, the collector or the electrolyte layer serves as the support member. Alternatively, a proper resin film or the like can be used as the support member when needed. In this case, the resin film which has a mold release property is desirable because the resin film needs to be peeled off and removed after being laminated on the electrode in the manufacturing process. Also other materials can be used as long as the materials have the characteristics required for a support member such as chemical and heat resistances.

The method of applying the slurry for electrode should not be particularly limited, and various application methods can be adopted, for example, application by a coater or the like, or coating by spraying.

After applying the slurry for electrode, the solvent contained therein is removed by heating and drying. At the same time, the cross-linking reaction is promoted to increase the mechanical strength of the solid polymer electrolyte. The solidification by heating and drying is performed using a vacuum dryer or the like. Conditions for the solidification by heating and drying are determined in accordance with the applied slurry for electrode and cannot be decisively defined. Preferably, the solidification is performed at 90 to 110 degrees centigrade for 1 to 10 hours, but is not limited to these heating and drying conditions. The conditions can be determined as long as the used solvent can be removed and the electrode having a polymer phase with a desired phase separation structure can be formed.

Furthermore, in the manufacturing method of the present invention, as the method of further filling the voids of the obtained electrode layer for the all solid polymer battery with the polar polymer and the lithium salt, after the solution of the polar polymer and the lithium salt is applied to the electrode surface, the solution may be caused to permeate the electrode, and then solidification may be performed by heating and drying. By this, the voids, which restrict the ion mobility within the electrode layer, can be filled with the solid polymer electrolyte (polar polymer and lithium salt). As a result, the reactivity of the electrode can be further improved.

Herein, the materials used for filling can be, in addition to the polar polymer and the lithium salt, additives such as the thermal polymerization initiator, the solvent, and the like, as described in the foregoing method for manufacturing the electrode for the all solid polymer battery. These materials are the same as those described in the foregoing method for manufacturing the electrode for the all solid polymer battery, and the blending amounts thereof can be determined in the same manner. Therefore the description thereof is omitted here.

The electrode surfaces are the surfaces of the electrode for the all solid polymer battery, which is obtained by heating and drying the slurry for electrode. The filling material may be applied to only one side of the electrode surfaces or both thereof. Moreover, the electrode may be immersed in the solution of the filling material, and the surface to which the solution is applied is not particularly limited. The application method is also not particularly limited.

The method of permeation is not particularly limited. The obtained electrode may simply be left for a predetermined period of time, or vacuum suction, pressure injection, and the like can be applied thereto.

After the permeation, the solution may be solidified by removing the contained solvent by heating and drying. At the same time, the cross-linking reaction is promoted to increase the mechanical strength of the solid polymer electrolyte. The electrode for the all solid polymer battery is thus completed. The heating and drying can be performed using a vacuum dryer or the like. Conditions for the solidification by heating and drying are determined in accordance with the applied slurry for electrode and cannot be uniquely defined. However, the conditions should not be limited to the foregoing heating and drying conditions. For example, pressure may be reduced during the heating because it is desirable that the solvent is gradually removed so as to leave no voids.

The all solid polymer battery of the present invention is characterized by using the aforementioned electrode for an all solid polymer battery of the present invention. With the electrode for the all solid polymer battery of the present invention, an all solid polymer battery having good cycle durability and reactivity can be constructed. Further, the bipolar battery of the present invention is characterized in that it uses the electrode for the all solid polymer battery previously described. With the electrode for an all solid polymer battery of the present invention, a bipolar battery having good cycle durability can be constructed. As a result, the bipolar battery can be provided as a compact battery with good cycle durability which can be applied to vehicles. When classified according to the types of the electrolyte of the battery, the all solid polymer battery means one using the all solid polymer electrolyte as the electrolyte, and is not limited to a bipolar battery. On the contrary, since the bipolar battery of the present invention is a battery employing the electrode for the all solid polymer battery, the bipolar battery of the present invention is a bipolar battery using the all solid polymer electrolyte as the electrolyte. Hereinafter, a brief description will be given of a bipolar battery which is a preferred embodiment of the all solid polymer battery of the present invention, but the present invention is not limited to this.

With reference to FIGS. 1 to 4, a brief description is given of a schematic basic construction of the bipolar battery which is a preferred embodiment of the all solid polymer battery according to the present invention.

As shown in FIGS. 1 to 4, bipolar electrodes 5 are provided, each of which includes a positive electrode layer 2 for the all solid polymer battery of the present invention on one side of a collector 1 and a negative electrode layer 3 for the all solid polymer battery of the present invention on the other side thereof. The positive and negative electrode layers 2 and 3 of the adjacent bipolar electrodes 5 are opposite to each other with a solid polymer electrolyte layer 4 (hereinafter, also just referred to as an electrolyte layer 4) interposed therebetween. In other words, a bipolar battery 11 includes an electrode stacked body 7 with a structure in which a plurality of the bipolar electrodes 5, each including the positive electrode layer 2 on one side of the collector 1 and the negative electrode layer 3 on the other side thereof, are stacked with the electrolyte layers 4 interposed therebetween. Electrodes 5a and 5b at the uppermost and lowermost layers of the electrode stacked body 7 do not have the bipolar electrode structure, but have a structure in which the positive electrode layer 2 or the negative electrode layer 3 is formed on the collector 1. The electrodes 5a and 5b are provided with positive and negative terminal plates 12 and 13 adjacent thereto, respectively. In the bipolar battery 11, positive and negative electrode leads 8 and 9 are joined to the positive and negative terminal plates 12 and 13, respectively. Moreover, insulating layers 14 are provided around the respective electrodes in order that the collectors are not brought into contact to each other and that the electrolytic solution does not leak out.

The number of stacked bipolar electrodes is adjusted in accordance with a desired voltage. If enough output can be secured with the sheet-like battery made as thin as possible, the number of stacked bipolar electrodes may be reduced.

In order to prevent an impact from the outside while using the battery and to prevent environmental degradation, the bipolar battery 11 of the present invention preferably has a structure in which the electrode stacked body 7 is encapsulated into a battery packaging material 10 under reduced pressure and the electrode leads 8 and 9 are led out of the battery packaging material 10. From the viewpoint of weight reduction, it is preferable to use a polymer-metal composite laminate film such as an aluminum laminate packaging material, in which metal (including an alloy) such as aluminum, stainless steel, nickel, and copper is covered with an insulation material such as a polypropylene film.

In a preferred method of hermetically sealing the electrode stacked body 7, first, the electrode stacked body 7 is accommodated in the battery packaging material 10, and part of the electrode leads 8 and 9 is extended out from the battery packaging material 10. The pressure inside the battery packaging material 10 is reduced, and part of or all the periphery of the battery packaging material 10 is joined by thermal adhesion.

Figure 4:
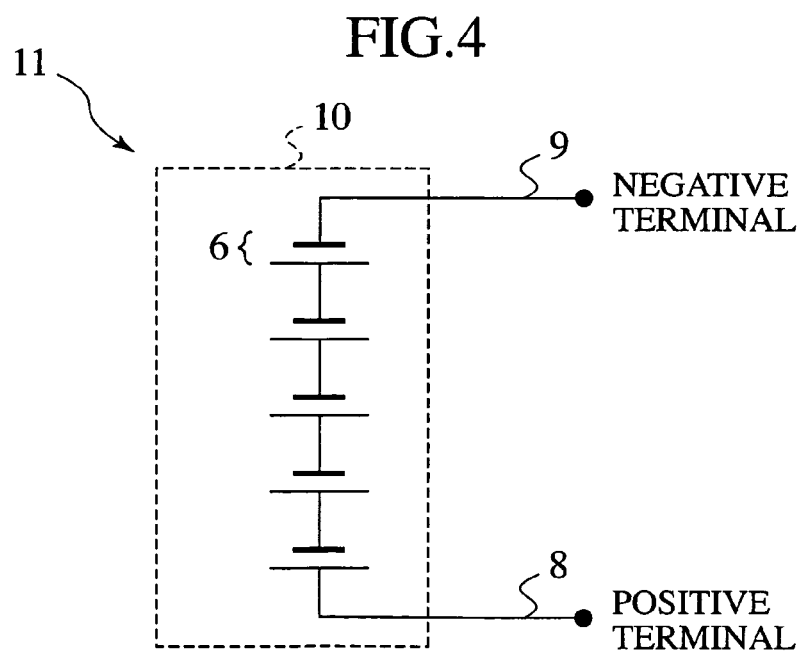
FIG. 4 is a schematic view showing the basic structure of the bipolar battery according to the present invention.

In the basic construction of the bipolar battery 11, as shown in FIG. 4, a plurality of single cell layers 6 stacked are connected in series. Note that the bipolar electrode of the present invention is suitably used in a lithium ion secondary battery in which charge and discharge are mediated by movement of lithium ions. However, this does not exclude the application of the bipolar electrode to other types of batteries as long as effects such as improvement in battery properties can be obtained.

Next, a brief description is given of each component of the bipolar battery 11 of the present invention, but the present invention should not be limited to these.

(Collector)

The collector which can be used in the present invention is not particularly limited, and for example, an aluminum foil, a stainless steel foil, a clad material of nickel and aluminum, a clad material of copper and aluminum, or a plated material of a combination of these metals can be preferably used. Alternatively, a collector having a metal surface covered with aluminum may be used. In some cases, a collector composed of two or more metal foils bonded together may be used. In the light of corrosion resistance, manufacturability, and cost efficiency, it is preferable to use an aluminum foil as the collector. The thickness of the collector is not particularly limited but usually about 1 to 100 μm.

(Positive and Negative Electrode Layers)

Both of the positive and negative electrode layers can employ the electrode for the all solid polymer battery of the present invention, and such positive and negative electrode layers for the all solid polymer battery have been already described in detail. In the battery of the present invention, even if any one of the positive and negative electrode layers employs the electrode for the all solid polymer battery of the present invention and the other layer is not the electrode for the all solid polymer battery of the present invention, the effect of the present invention can be sufficiently attained. Hereinafter, a description will be given of an electrode layer opposite to the electrode for the all solid polymer battery of the present invention, when the electrode for the all solid polymer battery of the present invention is used on one side only.

The positive electrode layer which is not the electrode for the all solid polymer battery contains positive electrode active material particles and a solid polymer electrolyte. In addition, lithium salt to increase ion conductivity and a conductive material to increase electron conductivity can be included.

As the positive electrode active material particles, composite oxide of transition metal and lithium can be used, which is also used in the liquid lithium ion battery. Specifically, examples thereof include: Li—Co based composite oxide such as $LiCoO_2$; Li—Ni based composite oxide such as $LiNiO_2$; Li—Mn based composite oxide such as spinel $LiMn_2O_4$; and Li—Fe based composite oxide such as $LiFeO_2$. In addition, the examples include: a phosphate compound or a sulfate compound of transition metal and lithium such as $LiFePO_4$; transition metal oxide or sulfide such as $V_2O_5$, $MnO_2$, $TiS_2$, $MOS_2$, and $MoO_3$; $PbO_2$; AgO; and NiOOH.

Preferably, the diameter of the positive electrode active material particles is smaller than that of the particles generally used in the lithium ion battery with a liquid electrolyte in order to reduce the electrode resistance of the bipolar battery.

The solid polymer electrolyte is not particularly limited as long as the polymer has ion conductivity. Examples of the polymer with the ion conductivity include polyethylene oxide (PEO), polypropylene oxide (PPO), and a copolymer thereof. Such a polyalkylene oxide based polymer can dissolve well lithium salts such as $LiBF_4$, $LiPF_6$, $LiN(SO_2CF_3)_2$, and $LiN(SO_2C_2F_5)_2$. Moreover, by forming a cross-linking structure, excellent mechanical strength is developed. In the present invention, the solid polymer electrolyte is contained at least one of the positive and negative electrode layers. However, to improve the battery properties of the bipolar battery, it is preferable that the solid polymer electrolyte is contained in both.

As the lithium salt, $LiBF_4$, $LiPF_6$, $LiN(SO_2CF_3)_2$, $LiN(SO_2C_2F_5)_2$, mixtures thereof, and the like can be used, but the lithium salt is not limited to these.

The conductive material can be acetylene black, carbon black, graphite, or the like, but is not limited to these.

The blending amount of positive electrode active material, solid polymer electrolyte, lithium salt, and conductive material should be determined taking into consideration the intended use (prioritizing output power, energy, etc.) of the battery and the ion conductivity. For example, if the blending amount of the solid polymer electrolyte in the positive electrode is excessively small, the resistance to ion conduction and diffusion increases within the positive electrode layer and reduces the battery performance. On the contrary, if the blending amount of solid polymer electrolyte in the active material layer is excessively large, the energy density of the battery is reduced. Accordingly, the amount of solid polymer electrolyte is determined taking into consideration these factors so as to be appropriate to the intended use.

Herein, specific consideration will be given to the case of manufacturing the bipolar battery giving a priority to the battery reactivity by using a solid polymer electrolyte (ion conductivity: $10^{-5}$ to $10^{-4}$ S/cm) of a current level. In order to obtain the bipolar battery with such a characteristic, the resistance to ion conduction between the active material particles is maintained relatively low by increasing the conductive material or reducing the bulk density of the active material. Simultaneously, the voids are increased and filled with the solid polymer electrolyte. The proportion of the solid polymer electrolyte is preferably increased by such a process.

The thickness of the positive electrode layer is not particularly limited and determined taking into consideration the intended use of the battery and the ion conductivity, as described in terms of the blending amount. The thickness of the general positive electrode layer is about 10 to 500 µm.

The negative electrode layer which is not the electrode for the all solid polymer battery contains negative electrode active material particles and solid polymer electrolyte. In addition, a lithium salt to increase the ion conductivity and a conductive material to increase the electron conductivity can be included. The negative electrode layer has basically the same contents as described in terms of the positive electrode layer other than the types of the negative electrode active material particles, and a description thereof is omitted.

As the negative electrode active material particles, negative electrode active material particles used also in the liquid lithium ion battery can be used. However, since the bipolar battery of the present invention uses the solid polymer electrolyte, in consideration of the reactivity in the solid polymer electrolyte, the negative electrode active material particles are preferably metal oxide or a composite oxide of metal and lithium. More preferably, the negative electrode active material particles are transition metal oxide or a composite oxide of transition metal and lithium, and still more preferably, titanium oxide or a composite oxide of titanium and lithium.

(Solid Polymer Electrolyte Layer)

The solid polymer electrolyte layer is composed of a polymer having the ion conductivity. The material thereof is not limited as long as the ion conductivity is provided. Examples of the solid polymer electrolyte include polyethylene oxide (PEO), polypropylene oxide (PPO), and a copolymer thereof. In addition, lithium salt to increase the ion conductivity can be contained in the solid polymer electrolyte layer. As the lithium salt, $LiBF_4$, $LiPF_6$, $LiN(SO_2CF_3)_2$, $LiN(SO_2C_2F_5)_2$, mixtures thereof, and the like can be used, but the lithium salt is not limited to these. A polyalkylene oxide based polymer such as PEO and PPO can dissolve well lithium salts such as $LiBF_4$, $LiPF_6$, $LiN(SO_2CF_3)_2$, and $LiN(SO_2C_2F_5)_2$. Moreover, by forming a cross-linking structure, excellent mechanical strength is developed.

The solid polymer electrolyte can be contained in the solid polymer electrolyte layer, the positive electrode layer, and the negative electrode layer. The same solid polymer electrolyte may be used or a different solid polymer electrolyte may be used for each layer.

The thickness of the solid polymer electrolyte layer is not particularly limited. However, in order to obtain a compact bipolar battery, it is preferable that the thickness thereof is made as thin as possible within a range where the functions of the electrolyte layer are ensured.

Meanwhile, the polymer preferably used for the solid polymer electrolyte is polyether based polymer like PEO or PPO at the present. Accordingly, it is low in oxidation resistance on the positive electrode side under the high temperature conditions. Therefore, in the case of using a positive electrode material with a high oxidation-reduction potential, which is generally used in the liquid lithium ion battery, it is preferable that the capacity of the negative electrode is less than the capacity of the positive electrode which is opposite thereto with the solid polymer electrolyte layer interposed therebetween. If the capacity of the negative electrode is less than that of the positive electrode opposite thereto, the potential of the positive electrode can be prevented from excessively increasing in the end period of charging. Note that, the capacities of the positive and negative electrodes can be calculated from theoretical capacities and manufacturing conditions in manufacturing the positive and negative electrodes. The capacity of a finished product can be directly measured by a measuring device.

However, when the capacity of the negative electrode is less than that of the positive electrode opposite thereto, there is a possibility that the potential of the negative electrode may be excessively lowered to impair the durability of the battery, so that it is necessary to pay attention to the charge/discharge voltages. For example, the average charge voltage of the single cell layer is set to a proper value so as to correspond to an oxidation-reduction potential of the positive electrode active material to be used, whereby a reduction of durability is prevented.

(Insulating Layer)

The insulating layer is formed around each electrode for the purposes of preventing contact between the collectors, leakage of the liquid electrolyte, and short circuit due to small irregularity of the end portions of the stacked electrodes.

For the insulating layer, insulating properties, sealing properties against leakage of the liquid electrolyte and permeation of water from outside, and heat resistance under the battery operation temperature are required. For example, epoxy resin, rubber, polyethylene, polypropylene, and the like can be used, but in the light of corrosion resistance, chemical resistance, manufacturability, cost efficiency, and the like, epoxy resin is preferred.

Figure 3:
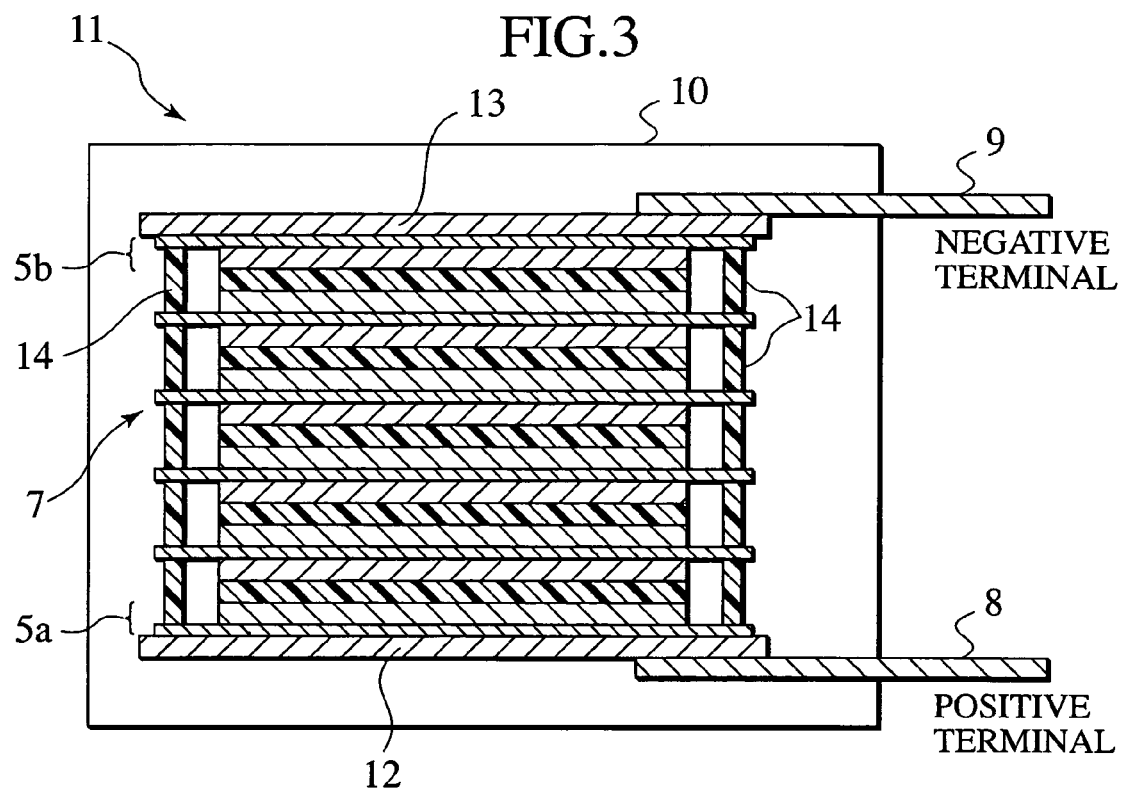
FIG. 3 is a schematic cross-sectional view showing a basic structure of the bipolar battery according to the present invention.

FIG. 3 shows the bipolar battery using the insulating layer, but the bipolar battery includes a function as a bipolar battery even without an insulating layer. Accordingly, the insulating layer can be provided as needed.

(Positive and Negative Electrode Terminal Plates)

The positive and negative electrode terminal plates have a function as a terminal. In the light of reduction of thickness, as thin as possible positive and negative electrode terminal plates are preferable. However, the stacked electrodes, electrolyte, and collectors have low mechanical strength, therefore it is desirable that the positive and negative electrode terminal plates have strength enough to hold and support these electrodes, electrolytes, and collectors from both sides thereof. Moreover, in the light of suppressing internal resistance within the terminal portions, it is desirable that the thickness of the positive and negative electrode terminal plates is usually about 0.1 to 2 mm.

As the material of the positive and negative terminals, for example, aluminum, copper, titanium, nickel, stainless steel (SUS), alloys thereof, and the like can be used. In the light of the corrosion resistance, manufacturability, cost efficiency, and the like, aluminum is preferred.

For the positive and negative electrode terminal plates, the same material or different materials may be used. Furthermore, these positive and negative electrode terminal plates may be composed of different materials stacked in multiple layers. The positive and negative electrode terminal plates should have the same size as the collectors.

FIG. 3 shows the bipolar battery using the positive and negative electrode terminal plates, but the bipolar battery includes a function as a bipolar battery even without the positive and negative electrode terminal plates. Accordingly, the positive and negative electrode terminal plates can be provided as needed.

(Positive and Negative Electrode Leads)

As the positive and negative electrode leads, a lead for use in the usual lithium ion battery can be used. In some cases, the part thereof leading out from the battery packaging material is very close to a heat source of the vehicle. Accordingly, in order not to affect automobile components (especially, electronic equipment) by electrical leak caused by contact of the leads to the heat source or the like, it is preferable that the part leading out from the battery packaging material is covered with a heat shrinkable tube which is insulative and heat resistant.

(Battery Packaging Material)

In the bipolar battery, preferably, the entire electrode stacked body is accommodated in the battery packaging material or a battery case (not shown) to prevent an impact from the outside and environmental degradation. In the light of weight reduction, it is preferable to use a battery packaging material such as a polymer-metal composite laminate film including an aluminum laminate packaging material, in which metal (including an alloy) such as aluminum, stainless steel, nickel, and copper is covered with an insulation material such as a polypropylene film. Preferably, the bipolar battery of the present invention has a construction in which the electrode stacked body is sealed by accommodating the electrode stacked body in the battery packaging material and then joining part of or entire periphery thereof by thermal adhesion. In this case, the positive and negative electrode leads can be sandwiched between the portion joined by thermal adhesion and exposed to the outside of the battery packaging material. Moreover, using the polymer-metal composite laminate film such as aluminum laminate packaging material, which is excellent in heat conductivity, is preferable in that heat is efficiently conducted from the heat source of the vehicle and the inside the battery is quickly heated to the battery operation temperature.

The bipolar battery of the present invention has the various characteristics as described above, and especially, this bipolar battery is compact. Accordingly, the bipolar battery of the present invention is suitable as the power source of vehicles, upon which particularly severe demands are made with regard to energy and power densities. The solid polymer electrolyte has a disadvantage in that the ion conductivity thereof is lower than that of the gel electrolyte. However, in the case of using the bipolar battery in vehicles, the environment around the bipolar battery can be maintained at a certain level of high temperature. In this connection, the bipolar battery of the present invention is suitable for use in vehicles which need a large capacity power source, such as electric vehicles and hybrid electric vehicles.

The method for manufacturing the bipolar battery of the present invention should not be particularly limited, and various methods can be properly utilized. Hereinafter, a brief description thereof will be made.

The method for manufacturing the electrode layer for the all solid polymer battery has been already described in detail. Hereinafter, a brief description will be given of a method for manufacturing the electrode layer (electrode which is not the electrode for the all solid polymer battery) opposite to the electrode layer which is the electrode for the all solid polymer battery of the present invention.

(1) Applying the Composition for Positive Electrode

First, the collector is prepared. The composition for the positive electrode is usually obtained as slurry and applied to one side of the collector.

The slurry for positive electrode is a solution containing a raw material for the solid polymer electrolyte, the positive electrode active material particles, and the lithium salt. As other components, the conductive material and the polymerization initiator are optionally contained. The raw material for the solid polymer electrolyte is PEO, PPO, a copolymer thereof, or the like, and preferably, includes a cross-linkable functional group (carbon-carbon double bond, etc.) in a molecule. The solid polymer electrolyte is cross-linked by using this cross-linkable functional group to increase the mechanical strength. For the positive electrode active material, lithium salt, and conductive material, the aforementioned compounds are used. The polymerization initiator needs to be selected in accordance with a compound to be polymerized. Examples thereof are benzil dimethyl ketal as a photo polymerization initiator and azobisisobutyronitrile as a thermal polymerization initiator. The solvent such as NMP is selected in accordance with the type of positive slurry for electrode. The amount of positive electrode active material particles, lithium salt, and conductive material to be added can be adjusted in accordance with the intended use of the bipolar battery and the like, and the amounts usually used can be added. The amount of polymerization initiator to be added is determined in accordance with the number of cross-linkable functional groups contained in the raw material polymer, and usually about 0.01 to 1 mass % of the raw material polymer.

(2) Forming Positive Electrode Layer

The collector with the slurry for positive electrode applied thereto is heated and dried to remove the solvent contained. At the same time, the cross-linking reaction is promoted to increase the mechanical strength of the solid polymer electrolyte. Heating and drying can be performed using a vacuum dryer and the like. The conditions for heating and drying are determined in accordance with the applied composition for the positive electrode layer.

(3) Applying the Composition for Negative Electrode

The composition for the negative electrode containing the raw material for the solid polymer electrolyte, the negative electrode active material particles, and the lithium salt is applied to the opposite side to the side to that to which the slurry for negative electrode is applied.

The slurry for negative electrode is a solution containing the raw material for the solid polymer electrolyte, the negative electrode active material particles, and the lithium salt. As the other components, the conductive material and the polymerization initiator are optionally contained. The raw material to be used or the amounts thereof are similar to those in the explanation in the "Applying composition for positive electrode" section, and the explanation thereof is omitted here.

(4) Forming Negative Electrode Layer

The collector with the slurry for negative electrode applied thereto is heated and dried to remove the contained solvent. At the same time, the cross-linking reaction is promoted to increase the mechanical strength of the solid polymer electrolyte. With this operation, the bipolar electrode is completed. Heating and drying can be performed using a vacuum dryer and the like. The conditions for heating and drying are determined in accordance with the applied slurry for negative electrode.

(5) Stacking Bipolar Electrode and Solid Polymer Electrolyte Layer

The solid polymer electrolyte layer to be stacked between the electrodes is prepared separately. The solid polymer electrolyte layer is manufactured by curing slurry which is prepared by dissolving the raw polymer for the solid polymer electrolyte and lithium salt in a solvent such as NMP. The thickness of the solid polymer electrolyte is controlled using a spacer. In the case of using the photo polymerization initiator, the slurry is poured into an optically transparent gap and exposed to ultraviolet radiation to promote the cross-linking reaction, thus forming a film. Needless to say, forming a film is not limited to this method. Radiation polymerization, electron-beam polymerization, thermal polymerization, or the like are selected in accordance with the type of the polymerization initiator. The solid polymer electrolyte and lithium salt to be used, the blending amount thereof, and the like have been previously described, and description thereof is omitted here.

The bipolar electrode and the solid polymer electrolyte layer prepared as described above are sufficiently heated and dried under high vacuum and then cut into a plurality of pieces with proper size. The width of the solid polymer electrolyte layers cut out is often made slightly smaller than that of the bipolar electrodes. A stacked battery is produced by bonding together the predetermined number of cut-out bipolar electrodes and solid polymer electrolyte layers. The number of stacked bipolar electrodes and solid polymer electrolyte layers are determined in consideration of the battery properties required for the bipolar battery. The bipolar electrodes with the solid polymer electrolyte layer formed on one or both sides may be directly bonded to each other. The electrodes are arranged on the solid polymer electrolyte in the respective outermost layers. On the outermost layer on the positive electrode side, the electrode having only a layer of the positive electrode active material formed on the collector is arranged. On the outermost layer on the negative electrode side, the electrode having only a layer of the negative electrode active material formed on the collector is arranged. Preferably, the step of stacking the bipolar electrodes and the solid polymer electrolyte layers to obtain the bipolar battery is performed under inert atmosphere. For example, the bipolar battery is preferably produced under argon or nitrogen atmosphere.

The bipolar battery may be accommodated in the battery case to prevent an impact from the outside or environmental degradation. For the material of the battery case, a metal sheet (aluminum, stainless steel, nickel, copper, etc.) with an inner surface covered with an insulation material such as a polypropylene film is suitable.

The effect of the present invention will be described using the following Examples and Comparative Example. However, the technical scope of the present invention is not limited to the following examples.

In the solid polymer electrolyte, a polyether based network polymer (referred to as PEL in Table 1 below) synthesized in accordance with the method of the literature (*J. Electrochem. Soc.*, 145 (1998) 1521.) was used as the polar polymer. LiN(SO$_2$C$_2$F$_5$)$_2$ (hereinafter, abbreviated as BETI) is used as the lithium salt.

(1) Production of Solid Polymer Electrolyte Layer (Solid Polymer Electrolyte Film)

First, the solid polymer electrolyte film was produced as follows. The above described polar polymer of 53 mass %, BETI as the lithium salt of 26 mass %, and benzil dimethyl ketal as the photo polymerization initiator, which is 0.1 mass % of the polar polymer, were added to prepare a solution using dry acetonitrile as the solvent, and then acetonitrile was removed by vacuum distillation. The space between the glass substrates was set using a Teflon spacer and filled with this high viscous solution, and then exposed to ultraviolet radiation for 20 minutes for photo polymerization. The obtained film was taken out and put into a vacuum vessel, and then heated and dried at 90 degrees centigrade for 12 hours under high vacuum to remove residual water and solvent.

(2) Production of Carbon Electrode

The carbon electrode was produced as follows. As the carbon powder, graphite with a mean particle size of 3 μm was used. The mass percent of graphite was the same as the total mass percent of the polar polymer and PVDF as the binder polymer. BETI was added to the mixture of graphite, the polar polymer, and the binder polymer such that the ratio of the number of oxygen atoms to the number of lithium atoms in PEL was 16:1. Further, azobisisobutyronitrile as the thermal polymerization initiator, which was 0.1 mass % of the total amount of the polar polymer and the binder polymer, was added thereto, and NMP was added as the solvent. The obtained mixture was thoroughly stirred to prepare slurry. The slurry was applied to a nickel foil by a coater, and heated and dried at 90 degrees centigrade for two or more hours by vacuum dryer to produce the carbon electrode.

Herein, as shown in Table 1, the negative electrodes were produced by changing a weight ratio of PEL to PVDF for each Example and Comparative Example. The thickness of the electrode layer was about 20 μm. As for PVDF, PVDF previously dissolved in NMP was used.

(3) Production of Battery for Durability Evaluation and Charge/Discharge Durability Evaluation Using the Same As the battery for the durability evaluation, a coin cell was produced in the following manner. The carbon negative electrode on the aforementioned collector was punched out by F=15 mm, and the punched-out carbon negative electrode was dried at 90 degrees centigrade for about half a day under high vacuum. In a glove box with argon atmosphere, the polymer electrolyte film with a thickness of about 100 μm which was produced in the above was sandwiched by the punched-out carbon negative electrode and the lithium metal used as a counter electrode. The charge/discharge durability evaluation was performed for the produced coin cell. The charge/discharge conditions were as follows. While the maximum charge voltage of the carbon negative electrode was set at 5 mV with respect to the lithium electrode, charge was performed for 10 hours at a constant current of 0.2 C and a constant voltage of 5 mV. After a pause of 10 minutes, discharge at constant current of 0.1 C was performed until the battery voltage became 3 V. The amount of electricity at that time was defined as a discharged amount of electricity (mAh). The results thereof are shown in Table 1.

The lithium electrode does not largely affect the discharge amount of electricity of the battery in this case under the condition that the lithium electrode has a sufficiently excessive capacity with respect to the carbon electrode even if the reaction resistance increases to some extent due to charge and discharge. Accordingly, the discharge electricity amount of the battery produced here is determined mainly depending on the state of the carbon electrode.

As shown in Table 1, the carbon electrodes in Examples 1 to 4 were produced by changing the amount of PVDF to the total weight of PVDF and the aforementioned PEL to 50, 25, 12, and 5%, respectively, and assembled into coin cells for the charge/discharge durability evaluation. In the Comparative Example 1, the carbon electrode was produced without PVDF added, and assembled into a coin cell for the charge/discharge durability evaluation. Table 1 compiles values obtained by dividing the discharge capacities at the 20th cycle by the initial discharge capacities.

Next, in Example 5, the voids within the carbon electrode of the example 1 were filled in the following manner. An NMP solution containing BETI and the aforementioned polar polymer was prepared, and azobisisobutyronitrile as the thermal polymerization initiator, which is 0.1 mass % of the polar polymer, was added to this solution. A small amount of this solution was applied using an applicator to the carbon electrode previously produced. After being left for 30 minutes, the carbon electrode was put into a vacuum dryer, and the pressure therein was reduced while heating the electrode. At this time, the carbon electrode was heated and dried for three hours at a heating temperature of 100 degrees centigrade. It was confirmed that the applied polar polymer was cross linked and solidified. Using this electrode, a battery was produced in the same manner as the example 1, and the charge/discharge durability evaluation was performed. The obtained result was added to Table 1. The initial discharge capacity of the electrode of the example 5 was larger than that of the example 1 by about 10%.

TABLE 1

Charge/discharge durability evaluation result of Negative electrode

| | Negative Electrode | PVDF/ (PVDF + PEL) | Discharge capacity/ Initial capacity |
|---|---|---|---|
| Ex. 1 | Graphite with binder polymer | 50% | 95% |
| Ex. 2 | Graphite with binder polymer | 25% | 90% |
| Ex. 3 | Graphite with binder polymer | 12% | 89% |
| Ex. 4 | Graphite with binder polymer | 5% | 85% |
| Ex. 5 | Graphite with binder polymer | 50% | 96% |
| Com. Ex. 1 | Graphite without binder polymer | 0% | 20% |

The above results reveal the following. First, the results in Table 1 reveal that the cycle durability of the carbon electrode according to the present invention is significantly improved compared to the comparative example. Moreover, it is also reflected that by filling the voids of the electrode with the solid polymer electrolyte, reactivity can be improved.

Figure 5:
FIG. 5 is a SEM view showing a polymer layer of a carbon electrode surface of a comparative example 1.
Figure 6:
FIG. 6 is a SEM view showing a polymer layer of a carbon electrode surface of an example 1.

FIGS. 5 and 6 show results of taking SEM views of the polymer phases in the surfaces of the carbon electrodes of Comparative Example 1 and Example 1 after being manufactured and before initial charge and discharge. In FIG. 5, a uniform surface feature was observed in a simple polymer type in which only PEL constitutes the polymer phase of Comparative Example 1. This reveals that, since there is no polymer that is phase-separated in the simple polymer type of only PEL, the phase-separated structure cannot be formed, and thus the uniform polymer phase is formed. On the contrary, in FIG. 6, non-uniform surface feature was observed in a binder complex type in which PVDF and PEL constitute the polymer phase of Example 1. This shows that the binder complex type of PVDF and PEL has a structure in which the polymers are phase-separated from each other without being mixed and uniform, and a non-uniform polymer phase is formed.

The entire content of a Japanese Patent Application No. P2002-326700 with a filing date of Nov. 11, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An electrode for an all solid polymer battery, comprising:
    electrode active material particles which can absorb and release lithium ion through oxidation-reduction;
    a binder polymer which binds the electrode active material particles and is a polymer containing a repeating unit of vinylidene fluoride;
    a polar polymer which is disposed between the electrode active material particles and is a polyether polymer; and
    lithium salt contained in the polar polymer,
    wherein the binder polymer and the polar polymer are phase-separated, and
    a proportion of the binder polymer to a total amount of the polar polymer and the binder polymer is within a range of 5 to 50 mass %.

2. An electrode for the all solid polymer battery according to claim 1,
    wherein voids within a layer of the electrode for the all solid polymer battery are further filled with the polar polymer and the lithium salt.

3. An electrode for the all solid polymer battery according to claim 1,
    wherein the electrode active material particles are carbon particles.

4. An electrode for the all solid polymer battery according to claim 1,
    wherein the electrode is obtained by applying slurry in which the electrode active material particles are dispersed in a solution containing the binder polymer, the polar polymer, the lithium salt, and a thermal polymerization initiator as needed to a support member, and then heating and drying the support member to which the slurry is applied.

5. An electrode for the all solid polymer battery according to claim 1,
    wherein voids within a layer of the electrode for the all solid polymer battery are further filled with the polar polymer and the lithium salt by applying a solution of the polar polymer and the lithium salt to an electrode surface, causing the solution to permeate the electrode, and solidifying the solution.

6. An all solid polymer battery, comprising:
    an electrode for an all solid polymer battery according to claim 1.

7. A bipolar battery, comprising:
an electrode for an all solid polymer battery according to claim 1.

8. An electrode for the all solid polymer battery according to claim 1,
wherein the electrode is obtained by applying slurry, in which the electrode active material particles are dispersed in a solution containing at least the binder polymer, the polar polymer and the lithium salt, to a support member, and then heating the support member, to which the slurry is applied, at 90 to 110 degrees centigrade in order to solidify the slurry and cause the binder polymer and the polar polymer to phase-separate.

* * * * *